Feb. 9, 1932.   F. A. JOSEPH   1,844,286
COUPLING DEVICE
Filed March 20, 1930   3 Sheets-Sheet 1

Inventor
Felix Alexander Joseph
By Usina & Rauber
His Attorneys

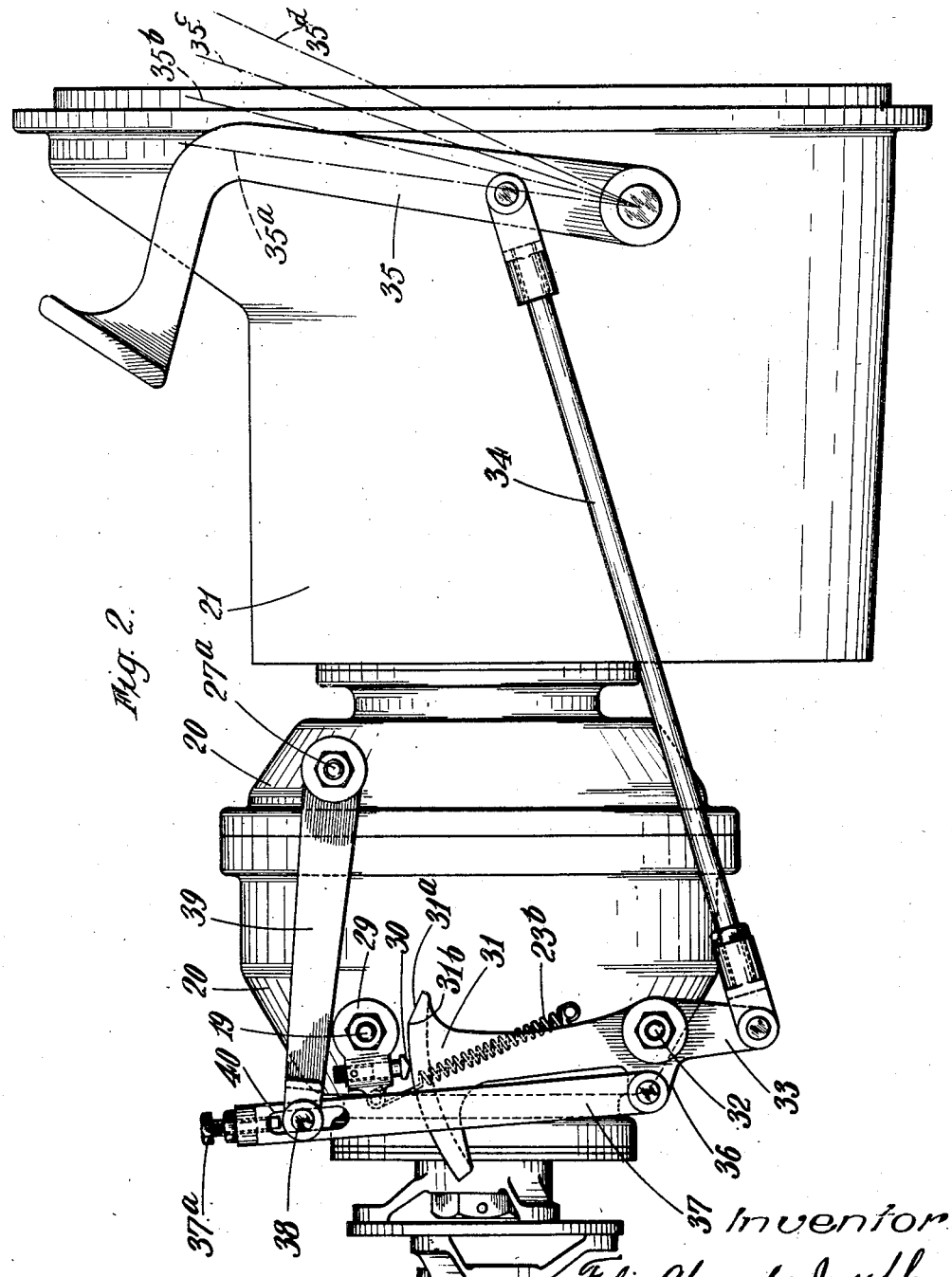

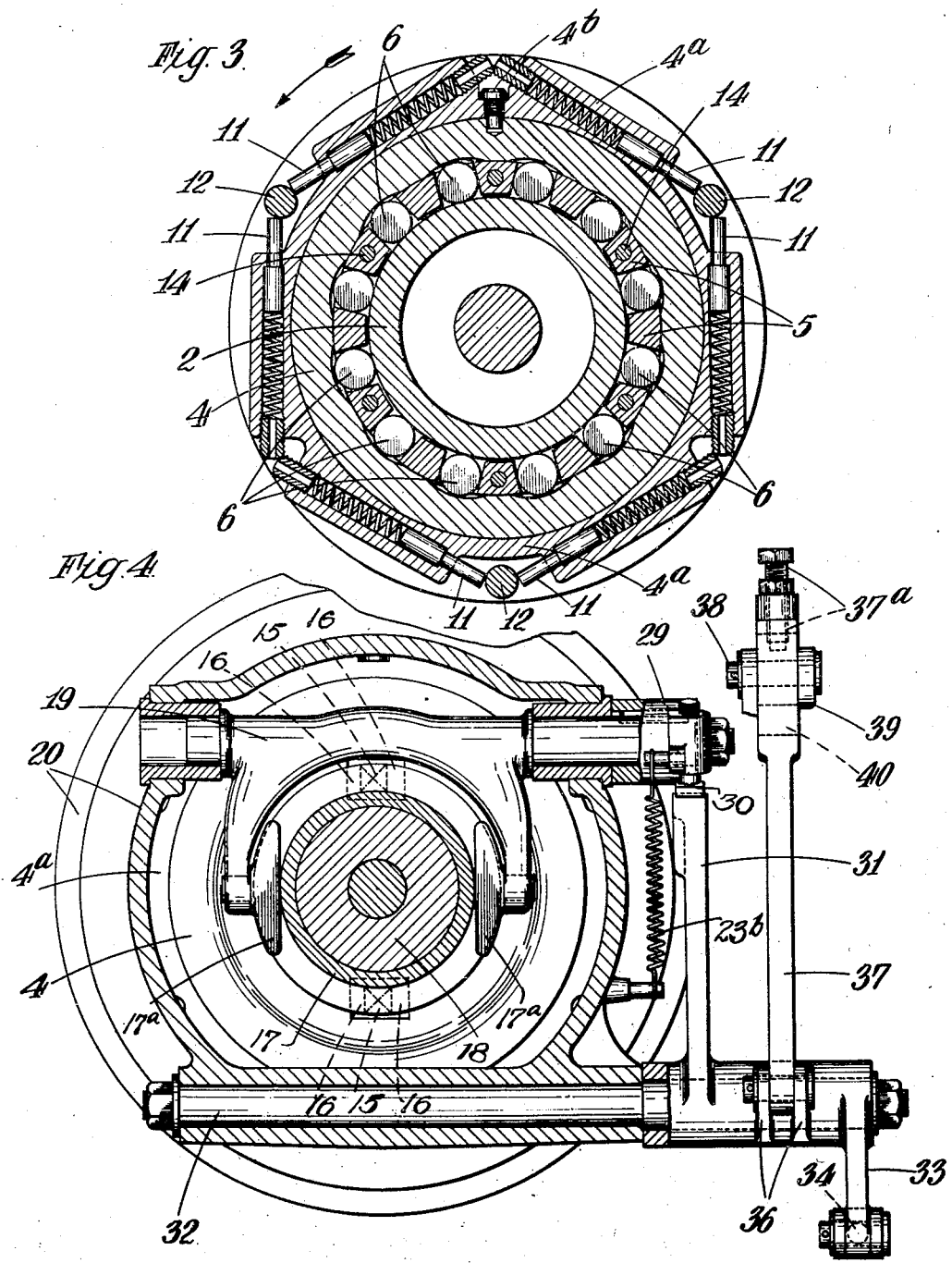

Patented Feb. 9, 1932

1,844,286

UNITED STATES PATENT OFFICE

FELIX ALEXANDER JOSEPH, OF HAMPSTEAD, LONDON, ENGLAND

COUPLING DEVICE

Application filed March 20, 1930, Serial No. 437,332, and in Great Britain March 26, 1929.

This invention relates to coupling devices and has for its object to provide improvements therein and relating thereto.

According to this invention I provide a coupling device comprising a cam member, an abutment member, wedging members for coupling the said cam and abutment members, a cage for controlling said wedging members, means for uncoupling said wedging members, a friction clutch effective between said cage and abutment member adapted to effect synchronization of the cam and abutment members before recoupling and means for disengaging said friction clutch.

I also provide, in a coupling device of the type having means for uncoupling and means for effecting synchronization of the driving and driven members preparatory to recoupling, an operable friction clutch effective between the driving and driven members and associated with a control member and a locking member, characterized in that the locking member is adapted to be released by the control member when the torque passing through the said friction clutch in its engaged position falls below a certain value.

In one form of device made in accordance with this invention the control member is formed integral with or fixed to one of the elements, driving or driven, of the said friction clutch, so that when the said clutch is in its engaged position and so long as synchronization between its elements has not been attained, a torque passes through the control member, and means are provided which ensure that as soon as the said torque falls below a certain value the control member automatically releases the locking member and permits the coupling device to become coupled.

As it is very desirable that synchronization be effected quickly and with the minimum of delay, the operable friction clutch should be both powerful and "fierce" in action and I employ a friction clutch of the double cone type which, when working in an oil bath, is provided with interrupted surfaces to ensure rapid action.

In one form of device I provide spring means which tend continuously to disengage the wedging members and to carry the control member into its neutral position.

The invention is particularly applicable to motor vehicles for the purpose of facilitating gear changing and may be disposed behind the gear box and serve as an isolating clutch for isolating the gear box from the road wheels.

One form of the device for this purpose comprises a bi-directional roller clutch.

Between the cage of the bi-directional roller clutch and the inner or abutment member is disposed an operable friction clutch while the control member is fixed to or made integral with the cage, and the locking member consists of a slidable member constrained to rotate with the cam member.

Referring to the drawings filed herewith:

Fig. 2 is a longitudinal elevation showing the controls as applied to an automobile.

Fig. 3 is a cross section on the line 3—3 Fig. 1 looking in the direction of the arrows.

Fig. 4 is partly an end elevation of the outer controls shown in Fig. 2 and partly a sectional elevation through the casing and mechanism on the line 4—4 in Fig. 1.

Figure 1:
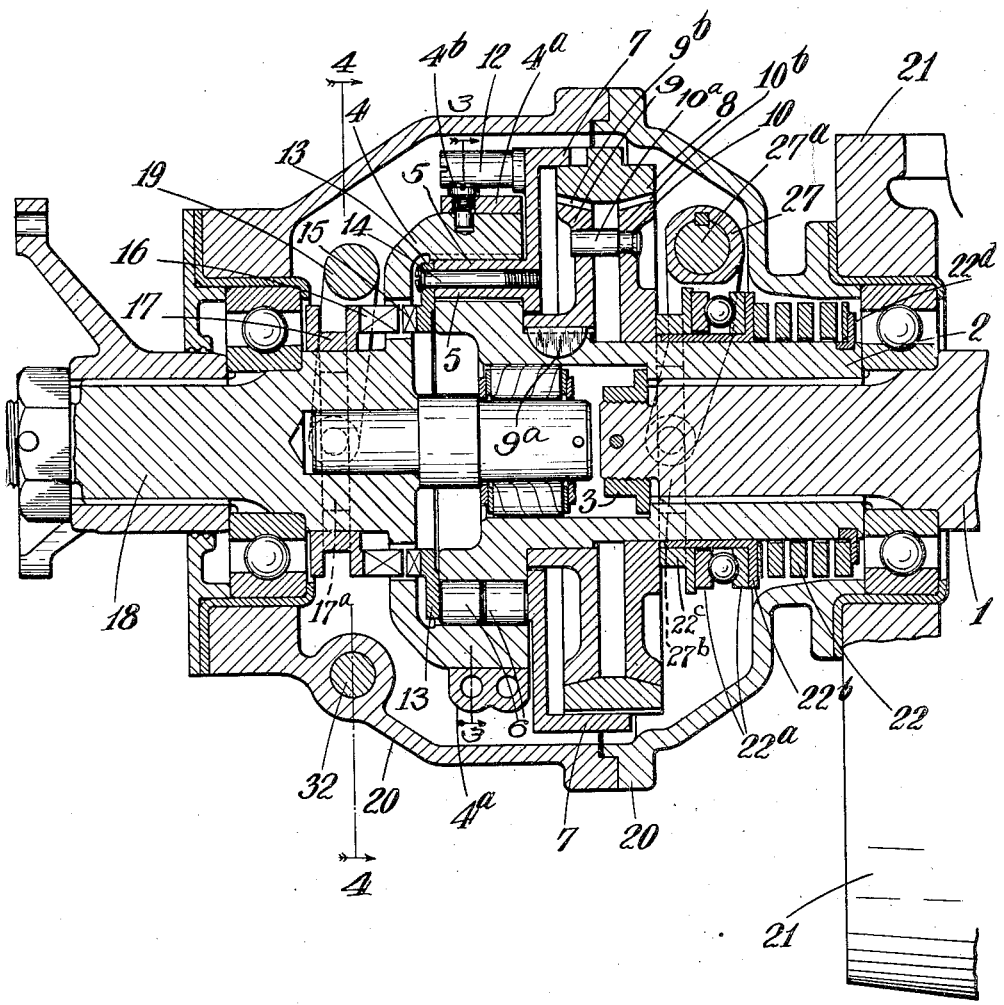
Fig. 1 is a longitudinal section of the device.

Referring to the said drawings:

1 is the driven shaft of the gear box to which is splined the abutment member or driving member 2 of the device secured by the nut 3. 4 is the cam member in the form of a drum with internal cam faces. 5 is a cage carrying a number of rollers 6. An extension 7 of the cage 5 carries one element 8 of a double cone clutch of which the other elements 9 and 10 are carried on the driving member 2 the element 9 being secured thereto by the woodruff key 9a and element 10 slidably mounted on the member 2 and having a peg 10a slidably engaging a hole in the element 9. The drum 4 is provided with a housing 4a secured thereto by the set screw 4b and carrying spring plungers 11 which co-act with pegs 12 mounted on the cage extension 7. The spring plungers 11 have a limited travel and serve when the plungers are in their extreme extended position to hold the rollers 6 in the neutral position between adjacent cam faces. A ring or control member 13 fixed by screws 14 to the cage 5 has dogs 15 each of which is adapted to co-act with a pair of dogs 16 (see Figs. 1 and 4) on a slidable locking member 17 carried on the shaft 18 of the drum 4. The wall of the drum 4 is slotted to receive the pairs of dogs 16 which are a sliding fit therein. The locking member 17 is grooved to receive the yoke pieces 17a of an operating fork 19 mounted on the rear half of a casing 20 which is bolted to the rear end of the gear box 21 as shown.

The elements 9 and 10 of the double cone clutch are provided with interrupted surfaces, such interruptions being produced by a number of slots 9b and 10b around the periphery (only one of each such slots being shown in the drawings and are urged into engagement with the cone member 8 by a spring 22 acting through the thrust race 22a and housing pieces 22b and 22c. The other end of the spring 22 abuts against a split ring 22d carried in a groove in the member 2. The housing piece 22c is adapted to be engaged by yoke pieces 27b (shown dotted in Fig. 1 similar to 17a) carried on the fork 27, mounted on the casing 20. The casing 20 which contains the revolving portions of the device also serves as an oil bath.

The controls external to the casing 20 are as follows: The shaft of the fork 19 carries a crank 29 with an adjustable stop 30 which normally rests on the circular portion of one arm 31 of a lever mounted on a pin 32 of which the arm 33 is connected by a link 34, to the clutch pedal 35, while the arm 36 operates through a link 37 having an adjustable screw 37a which co-acts with a pin 38 on a crank 39, mounted on the shaft 27a keyed to the fork 27. The link 37 has a slot 40 which engages the pin 38 thus providing a lost motion action. The arm of the lever 31 is formed with a heel 31a the purpose of which is described hereafter.

A spring 23b one end of which is anchored to the casing and the other end to the crank 29 urges the locking member 17 through fork 19 and yoke pieces 17a towards the control member.

With the device in the condition of normal drive as shown in the drawings, the device functions as follows:—

If the driving member should tend to revolve faster than the driven member (a condition corresponding to the engine driving the car) the cone clutch causes cage 5 to overtake the cam or driven member and force the rollers 6 into wedging engagement between the abutment member 2 and one set of cam faces of the cam member.

If the driven member should tend to revolve faster than the driving member (a condition corresponding to the car driving the engine) the cone clutch causes the cage 5 to lag with respect to the cam member and forces the rollers 6 into wedging engagement between the abutment member 2 and the other set of cam faces of the cam member.

In either condition spring plungers 11 are compressed, the torque capable of being transmitted by the cone clutch being very much more than sufficient to compress the spring plungers.

In operation assuming the car to be moving under its own momentum in a forward gear the device functions as follows:—

On depressing the clutch pedal 35 through a small angle from the position 35a to 35b the engine clutch becomes disengaged whereupon the spring plungers 11 move the cage till the rollers 6 are in neutral position and the gear box shaft 1 is driven by the shaft 18 through the double cone clutch. By a further movement of the clutch pedal towards to the position 35c the crank 31 is moved out of the way of the stop 30 and the dogs 15 of the control member 13 having been carried into line with the dogs 16 by the action of the spring plungers 11, the locking member 17 is shot by the spring 23b from its disengaged position shown in Fig. 1 into its locking position, with the dogs 16 and 15 in engagement.

By the last part of the movement of the clutch pedal 35 into the position 35c the double cone clutch is also disengaged through the action of arm 36 link 37 crank 39 fork 27, and the gear box is isolated. The gear lever (not shown) operating the gear box may then be moved into the position of a desired gear ratio and the clutch pedal 35 released. The clutch pedal, on being released, makes a partial return movement until the stop 30 engages the heel 31a, thus immediately re-engaging the double cone clutch which speeds up the shaft 1 to synchronize with the speed of shaft 18. But until this synchronization is substantially effected, a torque passes through the cone clutch and cage 5, control member 13, dogs 15 and 16 and locking member 17 and the locking member is held by friction from becoming disengaged so long as such torque is transmitted. Consequently, until synchronization is completed stop 30 sitting on the heel 31a prevents the complete return of the clutch pedal 35 and the engine clutch is prevented from engaging.

As soon as synchronization has been attained, the locking member is no longer held by friction. Consequently the stop 30 is no longer effective in preventing the complete return of the clutch pedal and rises on to the circular portion of the crank 31, causing fork 19 to take the locking member 17 into its disengaged position, and the engine clutch is at the same time re-engaged.

It is, of course, clear that any freedom of fit between dogs 15 and 16 would merely result whilst the cone clutch was in engagement and so long as synchronization between driving anod driven members was not attained, in a slight compression of spring plungers 11.

In Fig. 2 four positions of the clutch pedal are shown by dotted lines as follows:—

35a engine clutch fully engaged.

35b engine clutch declutched and the adjustable screw 30 resting on the corner 31b of the heel 31a.

35c the cone clutch disengaged by screw 37a co-acting with pin 38, adjustable screw 30 having passed down the heel 31a and the double dogs 16 engaging with dogs 15.

35d is the extreme position of the clutch pedal and the movement from position 35c, to 35d, could be utilized to bring into action a clutch stop (not shown) for quickly slowing down the rotating parts of the gear box.

What I claim and desire to secure by Letters Patent is:—

1. In a coupling device comprising a cam member, an abutment member and wedging members for coupling the said cam and abutment members, a cage for controlling said wedging members, means for uncoupling said wedging members, a friction clutch effective between said cage and abutment member adapted to effect synchronization of the cam and abutment members before recoupling and means for disengaging said friction clutch.

2. A coupling device comprising a cam member, an abutment member and wedging members for coupling said cam and abutment members, a control member for controlling said wedging members, means for operating said wedging members to uncouple said cam and abutment members, an engageable and disengageable friction clutch effective between said control and abutment members adapted to effect synchronization of said cam and abutment members preparatory to their being recoupled and a locking member associated with said control member for locking said wedging members in uncoupled position, said locking member being associated with said control member so as to be held in the locked position thereby so long as synchronization between said cam and abutment members has not been attained and to be released when the torque passing through said friction clutch falls below a certain value.

3. A coupling device comprising a cam member, an abutment member and wedging members for coupling said cam and abutment members, a cage for controlling said wedging members, means for operating said cage to uncouple said cam and abutment members, an engageable and disengageable friction clutch effective between said cage and abutment member adapted to effect synchronization of said cam and abutment members preparatory to their being recoupled and a locking member associated with said cage for locking said wedging members in uncoupled position, said locking member being frictionally associated with said cage so as to be held in the locked position thereby so long as synchronization between said cam and abutment members has not been attained and to be released when the torque passing through said friction clutch falls below that required to frictionally retain said locking member in the locked position.

4. In a coupling device comprising a cam member, an abutment member and wedging members for coupling the said cam and abutment members, a cage for controlling said wedging members, means for uncoupling said wedging members, a friction clutch effective between said cage and abutment member adapted to effect synchronization of the cam and abutment members before recoupling and means for disengaging said friction clutch, the said friction clutch being a double cone clutch.

5. In a coupling device having driving and driven members, wedging members for coupling the said driving and driven members and means for uncoupling and recoupling said driving and driven members, an operable friction clutch effective between the driving and driven members, a control member for controlling said wedging members, spring means associated with said control member to urge the said wedging members into their neutral position and a locking member capable of engaging the said control member when the wedging members are in their neutral position.

6. In an automobile having an engageable and disengageable clutch between the engine and the gearbox, a coupling device behind the gearbox comprising a cam member, an abutment member and wedging members for coupling said cam and abutment members, a control member for controlling said wedging members, means for operating said control member to uncouple said control and abutment members, an engageable and disengageable friction clutch effective between said control member and said abutment member adapted to effect synchronization of said cam and abutment members preparatory to their being recoupled, a locking member associated with said control member for locking said wedging members in the uncoupled position and operating means for operating said locking member, said means being associated with said control member so as to be held in the locked position so long as synchronization has not been attained, said operating means being associated with the engine clutch mechanism to prevent the re-engagement of the engine clutch until synchronization has been attained and the torque passing through said friction clutch falls below a certain value.

In testimony whereof I affix my signature.

FELIX ALEXANDER JOSEPH.